Oct. 11, 1966  E. BECK  3,278,661
METHOD OF COMPACTING AND AGGLOMERATING THERMOPLASTIC
MATERIALS RANGING FROM POWDERS TO GRANULES
Filed April 12, 1963  4 Sheets-Sheet 1

INVENTOR.
Erich Beck
BY
ATTORNEYS

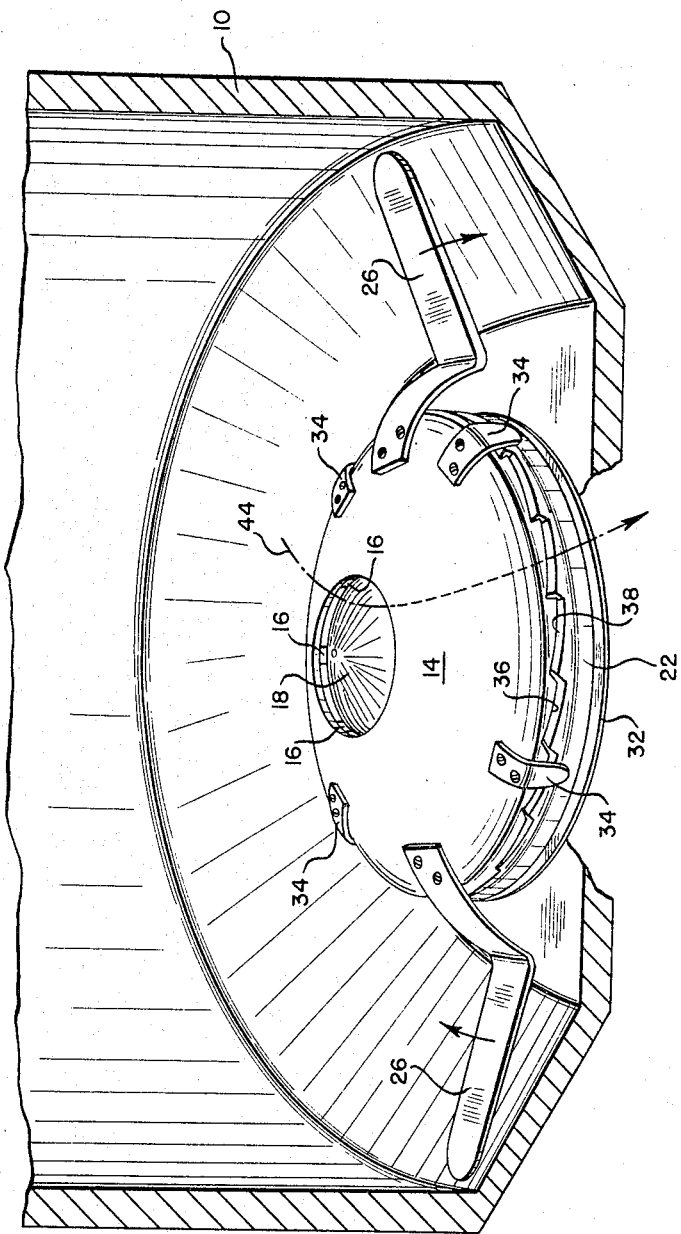

Oct. 11, 1966 E. BECK 3,278,661
METHOD OF COMPACTING AND AGGLOMERATING THERMOPLASTIC
MATERIALS RANGING FROM POWDERS TO GRANULES
Filed April 12, 1963 4 Sheets-Sheet 3

INVENTOR.
Erich Beck
BY
ATTORNEYS

Oct. 11, 1966　　　　　　　E. BECK　　　　　3,278,661
METHOD OF COMPACTING AND AGGLOMERATING THERMOPLASTIC
MATERIALS RANGING FROM POWDERS TO GRANULES
Filed April 12, 1963　　　　　　　　　　　　4 Sheets-Sheet 4

INVENTOR.
Erich Beck
BY
ATTORNEYS

United States Patent Office 3,278,661
Patented Oct. 11, 1966

3,278,661
METHOD OF COMPACTING AND AGGLOMERAT-
ING THERMOPLASTIC MATERIALS RANGING
FROM POWDERS TO GRANULES
Erich Beck, Hochfeldstrasse 20, Augsburg-
Goeggingen, Germany
Filed Apr. 12, 1963, Ser. No. 272,799
Claims priority, application Germany, June 7, 1962,
B 67,594
5 Claims. (Cl. 264—68)

The present invention relates to a method of compacting and agglomerating powdered thermoplastic materials, such as polyethylene powder, and mixtures of relatively low bulk density, to heat them by the application of mechanical energy and to granulate them.

In accordance with the invention, the temperature rise occurring during compacting and heating is of very short duration and the compacting means is disposed in the charge of material being processed, with the material being processed kept in continuous circulation and flowing through a pressure developing means.

A number of methods are known in which powdered material is mixed at high speed and heated and agglomerated without compression, solely by the application of energy applied by the mixing mechanisms employed. The machines including such mechanisms operate at maximum speeds of about 60 m./sec. (meters per second). Such a machine is disclosed in the published German patent application, DAS 1,101,919. In machines of that type, agglomeration takes place by balling with utilization of the heating action of rapidly rotating mechanisms, after a temperature near the melting point or in the softening range has been reached.

These known methods and machines have the drawback that the time of dwell at high tempreature is relatively long, since the agglomerating capability of such machines is a function of the overall temperature of the charge, and that the material must be preheated and simultaneously cooled to avoid lump formation. This necessitates the use of extra equipment.

With the foregoing drawbacks and disadvantages in mind, the object of the present invention is to provide an effective and efficient method and apparatus which will carry out the compacting and agglomeration of thermoplastic plastic materials with a short heating period and with a minimum of equipment.

The object of the present invention is attained by providing a pressure-developing means in a compacting and agglomerating apparatus, such means being located in a position such that a stream of thermoplastic powder continuously circulates therethrough. A special feature of the invention resides in the fact that the pressure-developing means is located within the free-flowing of fluidized product stream, with the material being circulated flowing continuously through and around it. The particles of thermoplastic material, which at a given moment are in a partial stream of the total circulating material are thus withdrawn directly ahead of the pressure-developing means at the temperature of the main stream and immediately after leaving the pressure-developing means are re-mixed with the main stream and assume or somewhat increase its temperature.

Compression of the material of the stream passing through the pressure-developing means is effected by subjecting the particles thereof to impact-like compressing actions or pressures of short duration, which generates localized heat resulting in a temperature rise. Agglomerates are produced by the simultaneous heating and compression in the pressure-developing means.

The compacted, densified and heated particles or agglomerates leaving the pressure-developing means at the higher temperatures attained therein are blended immediately into the main stream after emerging from the pressure-developing means. In the main stream the agglomerates experience a temperature drop and assume the resulting mean temperature of the main stream. stream.

The processing operation is carried out in a mixing tank or container and the circulation of the material to be agglomerated is continued until the entire contents of the chamber have been sufficiently densified and agglomerated. At the same time the whole charge may be continually cooled if necessary, so that a temperature rise throughout the charge in the chamber which might produce thermal shock is avoided. A temperature level corresponding to the melting point or agglomeration point, necessary for agglomeration of the thermoplastic material, is only reached for a small fraction of a second during the passage of the thermoplastic material through the pressure-developing means.

Tests have shown that highly densified and partially plasticized agglomerates can thus be produced at relatively low temperature, so that a sufficiently cooled finished product suitable for further processing is available after the apparatus has been shut off. The highly densified products produced are particularly useful as feed stock for extruders, the output of which is greater because of the high density of the feed. Furthermore, an expensive granulating plant is no longer necessary.

The improved process according to the invention is described hereinafter in connection with certain embodiments illustrated in the accompanying drawings.

In the drawings, in which like or corresponding parts or elements are designated by the reference numerals:

FIG. 2 is a broken perspective view of the circulating, agitating and compacting mechanisms shown in FIG. 1;

Figure 1:
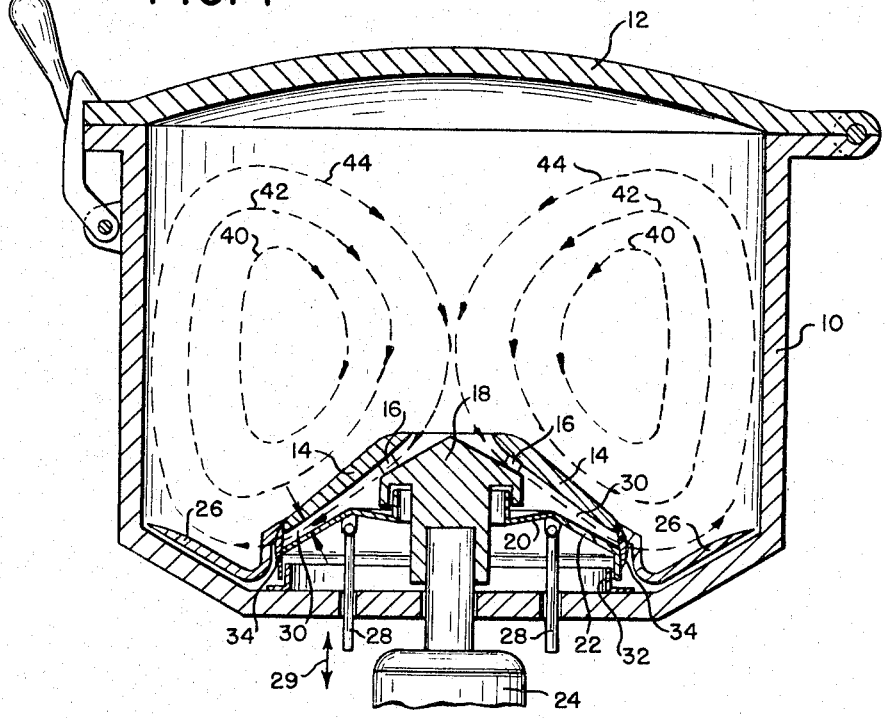
FIG. 1 is a vertical sectional view of one embodiment of an apparatus provided with circulating, agitating and pressure-developing mechanisms for carrying out the improved method according to the invention.

Referring to the embodiment illustrated in FIG. 1 of the drawings, the apparatus shown therein comprises a tank or container 10 provided with a hinged latched cover 12, as shown. The compacting or pressure-developing means located in the container 10 comprises a rotatable upper conical-shaped plate 14 attached by spacer lugs 16 to a rotatable hub 18 having a cone-shaped top, as shown, and a lower stationary plate 20 having a frusto-conical shaped compacting section 22 located below and spaced from the plate 14. The hub 18 is mounted on the shaft of a variable speed motor drive 24 which is used for rotating the plate 14. Two or more circulating and agitating blades 26 project from and are fixed to the periphery of the rotatable plate 14. They extend radially along the bottom to a point near the side wall of the container.

The plate 14 and the section 22 of the plate 20 comprise the compacting elements, and the plate 20 is adjustably spaced with respect to the plate 14 by movement of rods 28 in the direction of the arrow 29, so that the distance 30 between the elements 14 and 22 may be adjusted to increase or decrease the compacting pressure. The plate 20, as illustrated, includes an upper flanged rim sealed with respect to the hub 18, and a lower downwardly-extending flanged rim sealed with respect to an annular flange 32 attached to the bottom of the container 10. Angularly-spaced knives 34 are fixed to the lower periphery of the rotatable compacting element 14. These knives extend down and overlap the lower rim of the compacting section 22.

Figure 4:
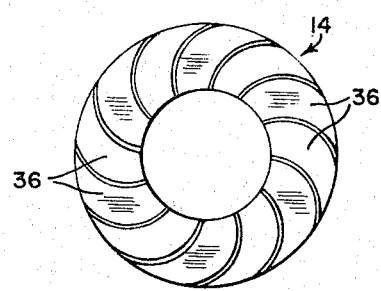
FIG. 4 is a view similar to that of FIG. 3 illustrating an alternative form of compacting surface of one of the elements of the pressure-developing means provided with spiral grooves.
Figure 3:
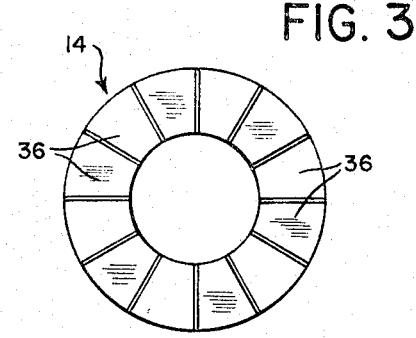
FIG. 3 is a diagrammatic view illustrating the active surface of one of the compacting elements shown in FIGS. 1 and 2, provided with radial grooves.

The location of the knives 34 and of the agitating and circulating blades 26 are shown more in detail in FIG. 2. FIG. 2 also shows the compacting elements 14 and 22 as being provided respectively with grooves 36 and 38 which may be radial grooves as illustrated in FIG. 3 or spiral grooves as illustrated in FIG. 4. These grooves 36 and 38, of course, alternate with ridges which are effective for producing impact pressure effects of short duration due to the rotation of the compacting element 14 relative to the stationary element 22.

When a batch of powdered thermoplastic material is placed in the container 10 for agglomeration and the elements 14, 18, 26 and 34 rotated at high speed, for example 1000 to 3000 r.p.m., the powdered material is agitated and circulated in a manner which is illustrated diagrammatically by the dotted line stream loops 40, 42 and 44 inwardly from the periphery toward the axis of the container. Some of the material is circulated outside the rotating member 14, as illustrated by the loops 40 and 42, while the partial stream 44 of the circulating material flows downwardly into and between the compacting elements 14 and 22 where the particles are subjected to compacting, heating and agglomeration. As the material emerges from the compacting mechanism, it is acted on by the knives 34 which cut up any large sized, compacted agglomerates. As the processing of the material in the container continues, the dense agglomerates tend to flow in the streams 40 and 42 while the lighter powdered material tends to flow in the partial stream 44 and through the compacting mechanism, and the operation is continued until practically all of the charge in the container is converted into dense granules of the thermoplastic material. Upon completion of the batch, the electric motor 24 is turned off and the resulting granules removed, after which another batch is put into the container and processed.

Figure 5:
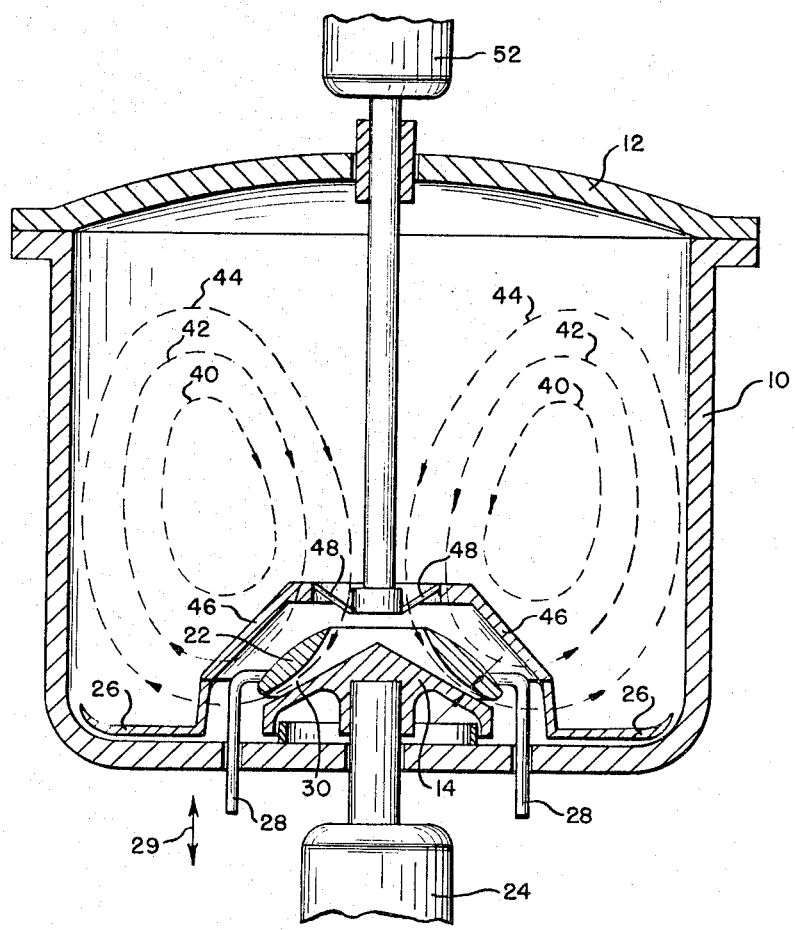
FIG. 5 is a view similar to that of FIG. 1 illustrating a further embodiment of an apparatus for carrying out the improved method of the invention.

In the embodiment of the apparatus illustrated in FIG. 5 of the drawings, the pressure-developing elements 14 and 22 are located so that the latter is above the former and the circulating and agitating mechanism is driven independently of the conical-shaped compacting element 14, so that each can be driven at the desired optimum speed. The stationary compacting element 22 in FIG. 5 is frusto conical in shape and provided with a central opening at the top for the flow of powdered thermoplastic material to be compressed and agglomerated between it and the rotating element 14.

The circulating and agitating mechanism illustrated in FIG. 5 includes a conical-shaped disc or plate 46 somewhat like the compacting element 14 in FIG. 1. It carries the veins or blades 26 as in FIG. 1 and its upper portion is connected by spokes 48 to a driving shaft 50 driven by a variable speed motor drive 52.

The partial stream 44 in the embodiment illustrated in FIG. 5 flows around the spokes 48 and between the compacting elements 14 and 22, which may be provided with facing grooved surfaces of the type illustrated in FIGS. 2 to 4. The speed of the revolving pressure-developing disc 14 is adjustable by means of the variable drive 24 and the flow ratios of the material being processed may be optimally selected by proper choice of the speed of the circulating and agitating means driven by the variable speed motor drive 52.

Figure 6:
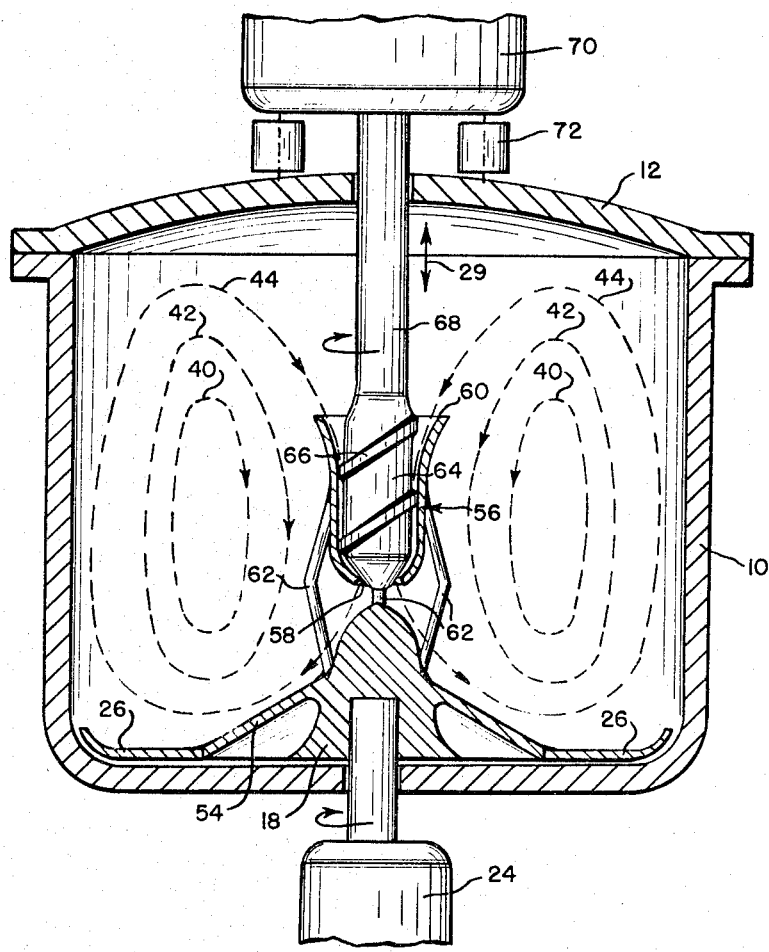
FIG. 6 is a view similar to that of FIGS. 1 and 5, illustrating a third embodiment of an apparatus for carrying out the improved method.

In the embodiment of the apparatus illustrated in FIG. 6 the rotation of the agitating and circulating means for the powdered thermoplastic material is effected by the motor drive 24 as in FIG. 1, and it also drives one of the pressure-developing elements. In this instance the shaft of the motor 24 carries a rotatable hub 18 provided with a downwardly sloping annular conical-shaped skirt 54 to which the blades 26 are attached. One of the pressure-developing elements comprises a screw cylinder 56, bowl-shaped at the bottom adjacent its outlet opening 58, and provided with a flaring top 60. This screw cylinder is attached to and supported axially above the driving hub 18 by means of spaced straps 62 forming a spider structure, so that the screw cylinder 56 is rotated with the hub 18.

The other pressure-developing element comprises a compacting screw 64 having an external helical rib or thread 66 and mounted on the lower end of a shaft 68 driven by a variable speed motor drive 70. The position of the screw 64 in the screw cylinder 56 may be changed in the direction of the arrow 29 by conventional means shown diagrammatically at 72. The narrower the space provided in the lower portion of the screw cylinder 56, the greater the back pressure, heating and compression developed on the material.

It will be noted that the shaft of the motor drive 24 and the shaft 68 are driven in the same direction as indicated by the arrows and that, therefore, the conveying and compacting by the screw 64 is effected and varied by a properly chosen differential speed between the parts 56 and 64. The agitating mechanism and the screw cylinder 56 may be driven at a speed of from 1000 to 3000 r.p.m., while the screw 64 may be driven at a speed of from 500 to 2000 r.p.m. From these figures it will be seen that, in general, the screw 64 is driven at a speed of from about one-half to about two-thirds of the speed of the screw cylinder 56.

In general, the operations carried out in the embodiments shown in FIGS. 5 and 6 are the same as those carried out in the embodiment shown in FIGS. 1 and 2, but somewhat better control may be achieved in the apparatus shown in FIG. 6 by the rotation of both of the pressure-developing elements and the ability to vary the speed differential between them. In this embodiment the partial stream 44 flows into the upper portion of the rotating screw cylinder 56 and is fed therethrough compressed, heated and agglomerated. As the agglomerates emerge from the bottom of the pressure cylinder, they are broken up to some extent by the rapidly moving straps 62.

The various embodiments of the method of the present invention may be employed for the processing of thermoplastic plastic materials of various types to produce dense granules. Examples of materials processed are: rigid polyvinylchloride, polyvinylchloride powder containing a stabilizer, polyvinylchloride powder containing a stabilizer and a plasticizer, polyethylene powder and polyethylene chips of the type produced by a cutting mill. The temperatures to which different thermoplastic materials are heated in the compacting and agglomerating zones of the apparatus may vary somewhat according to the particular material. For example, plasticized polyvinylchloride is heated to a temperature of from 70° to 80° C., rigid polyvinylchloride up to a temperature of about 120° C., polyethylene powder at about 100° C. and polyethylene chips to about 70° C. The temperatures to which other thermoplastic materials may be heated are readily determined by simple melting type tests.

The processed material has the shape of small ball-like granules with a rough surface and are much larger in size than the feed material, which may be in powder form or mixtures of unsymmetrical granules and chips of various sizes.

I claim:
1. The method of compacting and agglomerating thermoplastic materials ranging in size from powders to granules, comprising subjecting a quantity of the thermo- plastic material to agitation and circulation in a container, passing a portion of the circulating material through a compacting and agglomerating zone located in the container in a position such that circulating material flows around and through the compacting zone, subjecting the portion of the material flowing through the compacting and agglomerating zone to simultaneous compression and heating to effect compacting and agglomeration of the material passing through the compacting and agglomerating zone, discharging the resulting agglomerated and compacted thermoplastic materials from the compacting and agglomerating zone into the circulating material in the container, and continuing the agitation and circulation of the material to be compacted until it is caused to flow through the compacting and agglomerating zone and therein converted to compacted and agglomerated granules of thermoplastic material.

2. The method as claimed in claim 1, in which the compacting zone is located centrally in the container and includes an inlet at its upper end and outlet at its lower end.

3. The method as claimed in claim 2, in which the material to be compacted in the container is caused to flow upwardly in the outer portion of the container and then inwardly and downwardly toward the central portion of the container with a portion of the circulating material flowing downwardly into the inlet of the compacting zone.

4. The method as claimed in claim 1, including the step of subjecting the material flowing through the compacting zone to a rapid short-time compression and consequent heating and agglomeration thereby producing densified agglomerates.

5. The method of compacting and agglomerating thermoplastic materials, such as polyethylene powder and other plastic powders, ranging in size from powders to granules to produce larger more compact granules, comprising subjecting a quantity of the thermoplastic material to agitation, frictional heating, high pressure and circulation in a container, passing a portion of the circulating, and by agitation fluidized material, through a frictional heating, compacting and agglomerating zone located in the container in a position such that circulating fluidized material flows around and through the said frictional heating, compacting and agglomerating zone, subjecting the portion of the material flowing through said zone to simultaneous compression, friction and heating to effect compacting and agglomeration of the material passing through the frictioning, compacting and agglomerating zone, discharging the resulting agglomerated and compacted thermoplastic material from the frictioning, compacting and agglomerating zone into the circulating material in the container, and continuing the agitation and circulation of the material to be compacted until it is caused to flow through the frictioning, compacting and agglomerating zone and therein converted to compacted and agglomerated granules of thermoplastic material.

References Cited by the Examiner

UNITED STATES PATENTS

| | | | |
|---|---|---|---|
| 2,232,444 | 2/1941 | Frenkel | 18—1 |
| 2,771,347 | 11/1956 | Beck et al. | 18—1 XR |
| 2,871,510 | 2/1959 | Sackett | 18—1 |
| 2,914,797 | 12/1959 | Cavanagh | 18—1 |
| 2,942,299 | 6/1960 | Larson | 264—117 |
| 3,010,177 | 11/1961 | Thompson et al. | 264—117 |
| 3,114,930 | 12/1963 | Oldham et al. | |

FOREIGN PATENTS

| | | |
|---|---|---|
| 789,841 | 1/1958 | Great Britain. |
| 575,209 | 7/1924 | France. |
| 1,197,520 | 12/1959 | France. |
| 915,072 | 7/1954 | Germany. |
| 1,101,918 | 3/1961 | Germany. |

ROBERT F. WHITE, *Primary Examiner.*

ALEXANDER H. BRODMERKEL, *Examiner.*

P. E. ANDERSON, *Assistant Examiner.*